Nov. 18, 1941.  E. B. GELLATLY  2,263,458
CONVEYER
Filed June 30, 1938  4 Sheets-Sheet 1
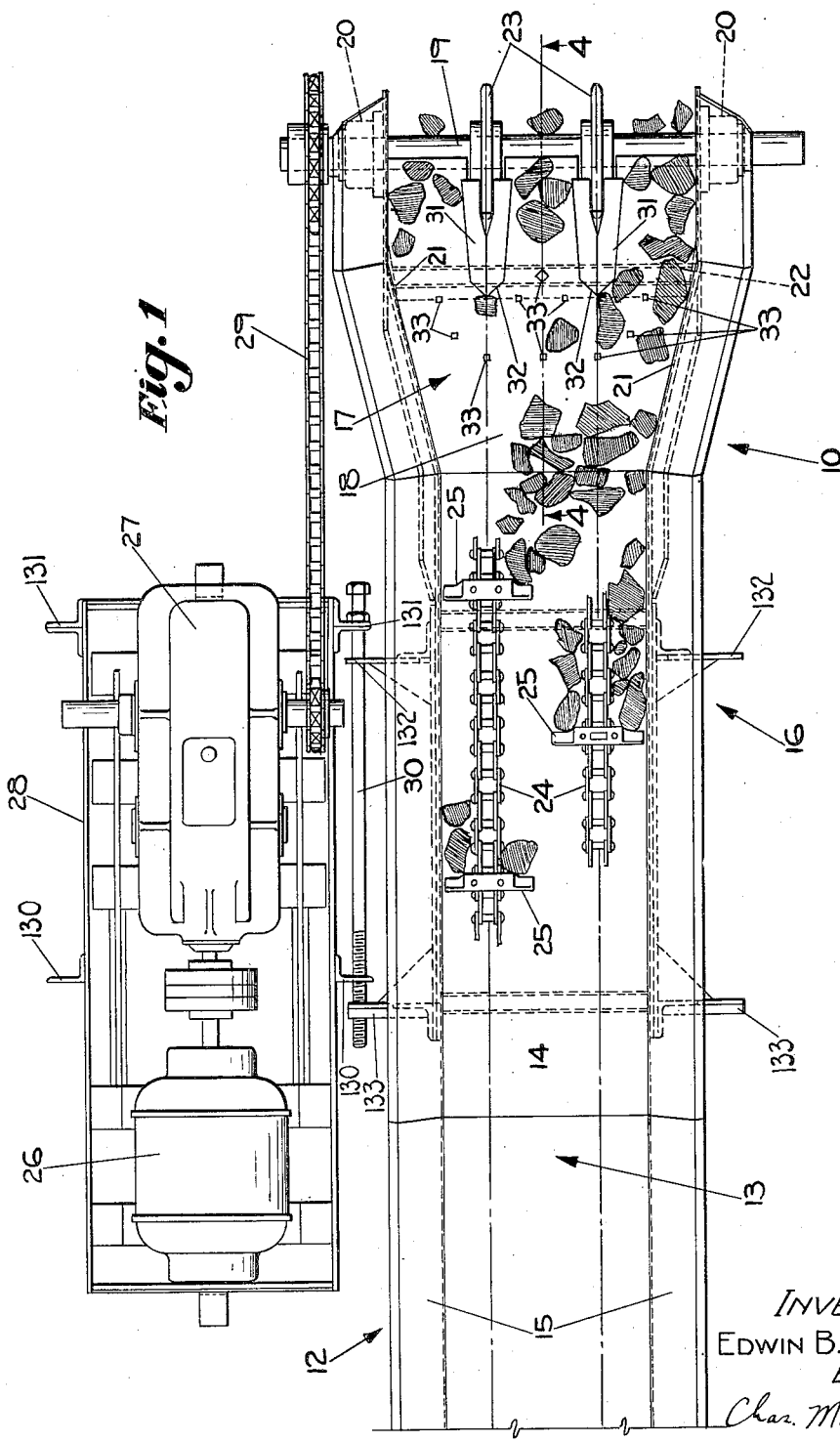
INVENTOR:
EDWIN B. GELLATLY,
BY
Chas. M. Nissen,
ATTY.

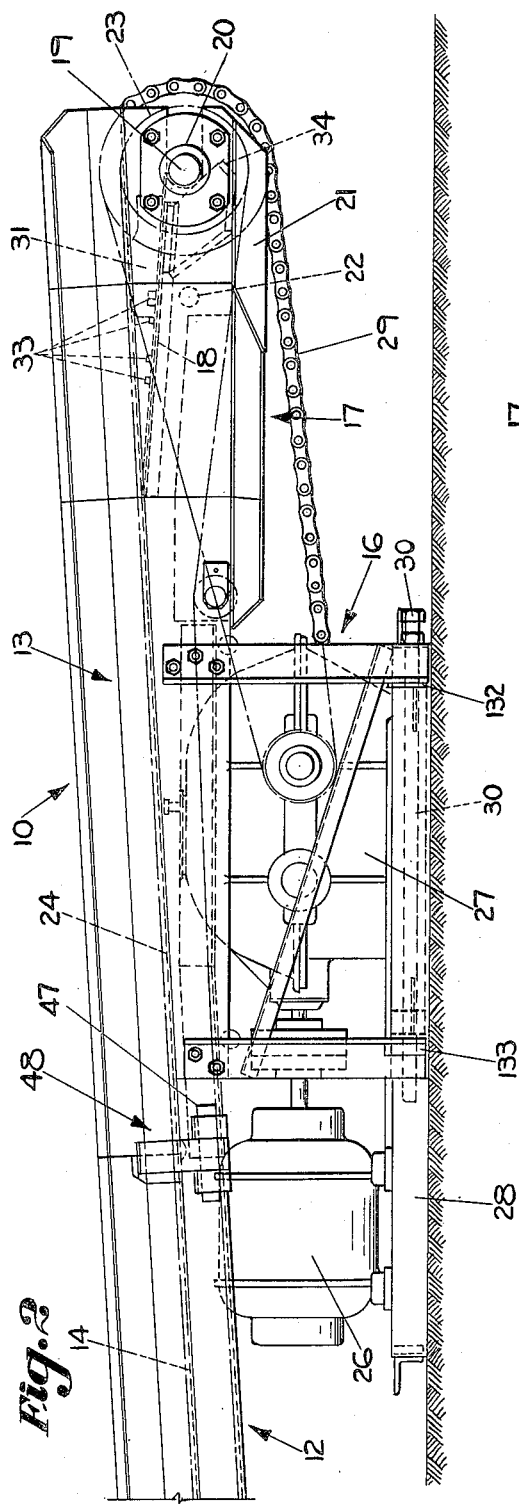
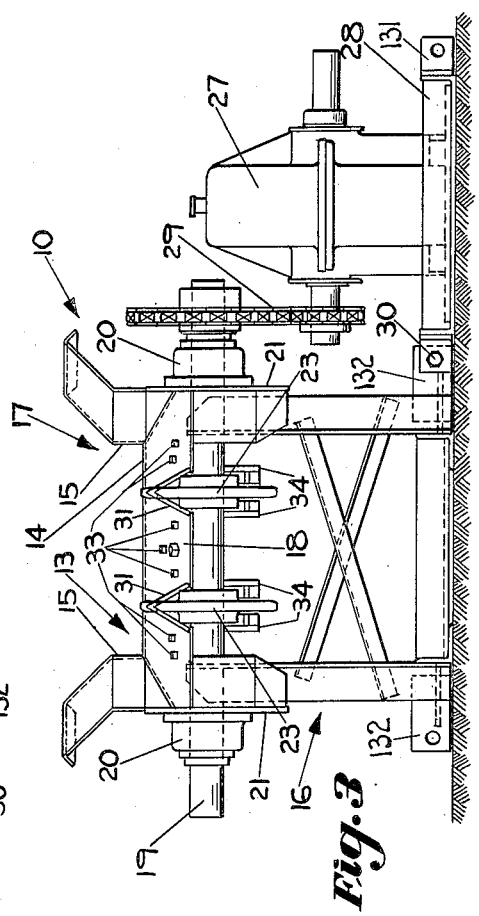

Nov. 18, 1941.  E. B. GELLATLY  2,263,458
CONVEYER
Filed June 30, 1938  4 Sheets-Sheet 4
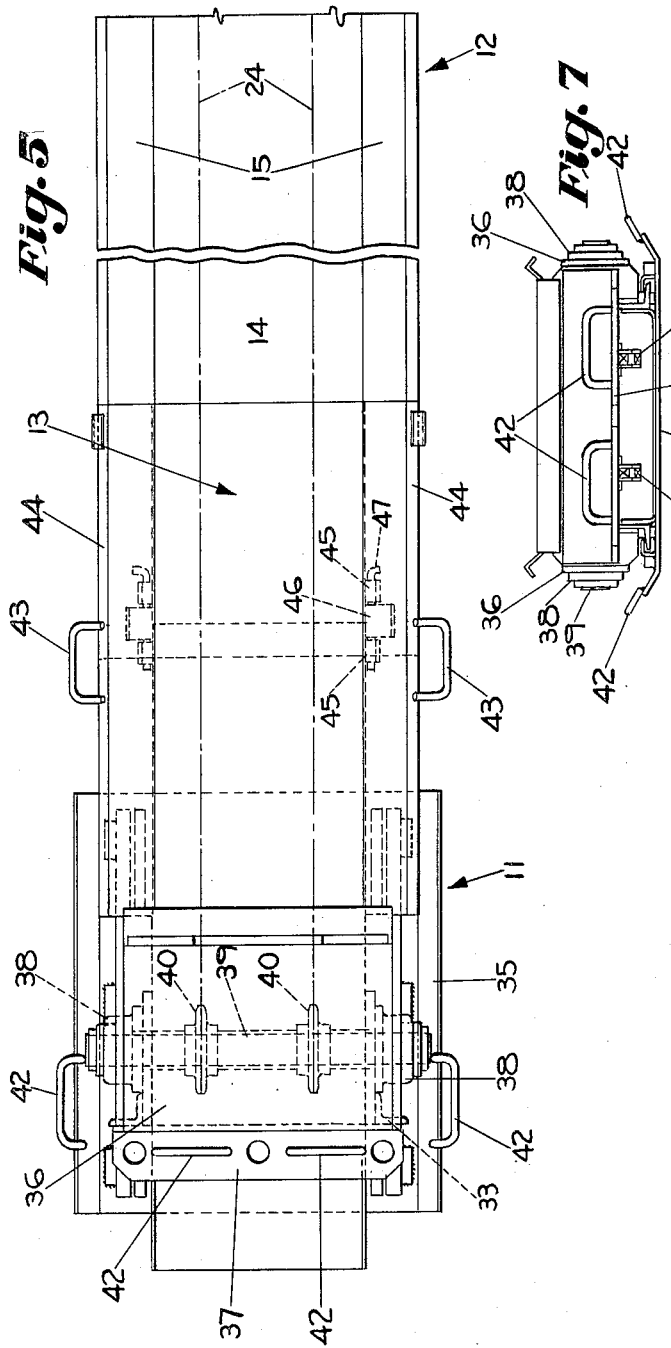
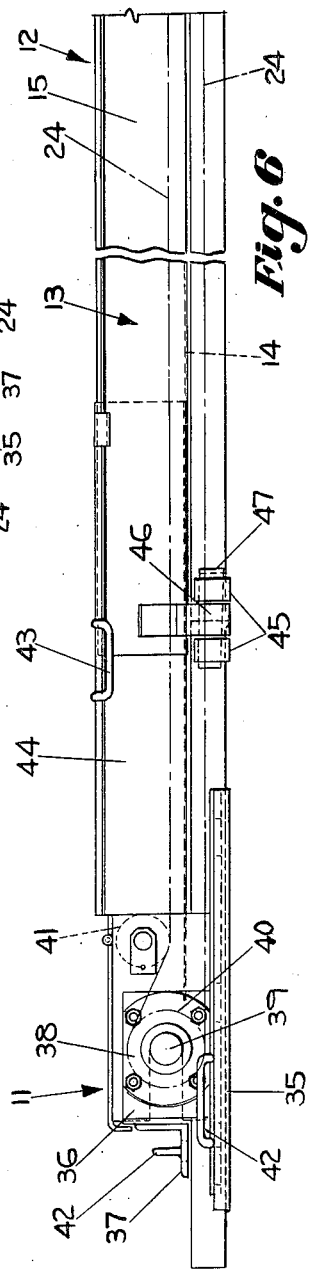
INVENTOR:
EDWIN B. GELLATLY,
BY
Chas. M. Nissen,
ATT'Y.

Patented Nov. 18, 1941

2,263,458

UNITED STATES PATENT OFFICE 2,263,458

CONVEYER

Edwin B. Gellatly, Pittsburgh, Pa., assignor to The Jeffrey Manufacturing Company, a corporation of Ohio Application June 30, 1938, Serial No. 216,789

12 Claims. (Cl. 198—168)

This invention relates to a conveyer and particularly to a scraper type extensible length chain conveyer.

An object of the invention is to provide an improved conveyer of the above mentioned type with an improved type of discharge head which will prevent material, such as coal, throwing the conveyer chain off of the head or drive sprocket thereof.

Another object of the invention is to provide an improved extensible scraper conveyer which is of considerable length with independent conveyer chains and conveyer flights.

Still another object of the invention is to provide improved and simplified coupling means for a pan type of extensible scraper conveyer.

Other objects of the invention will appear hereinafter, the novel features and combinations being set forth in the appended claims.

Fig. 1 is a plan view of the head end of the conveyer of my invention;

Fig. 2 is a side elevational view of said head end;

Fig. 3 is a front elevational view of said head end;

Fig. 5 is a plan view of the tail end of the conveyer;

Fig. 6 is an elevational view of said tail end; and

Fig. 7 is an end view thereof.

Figure 4:
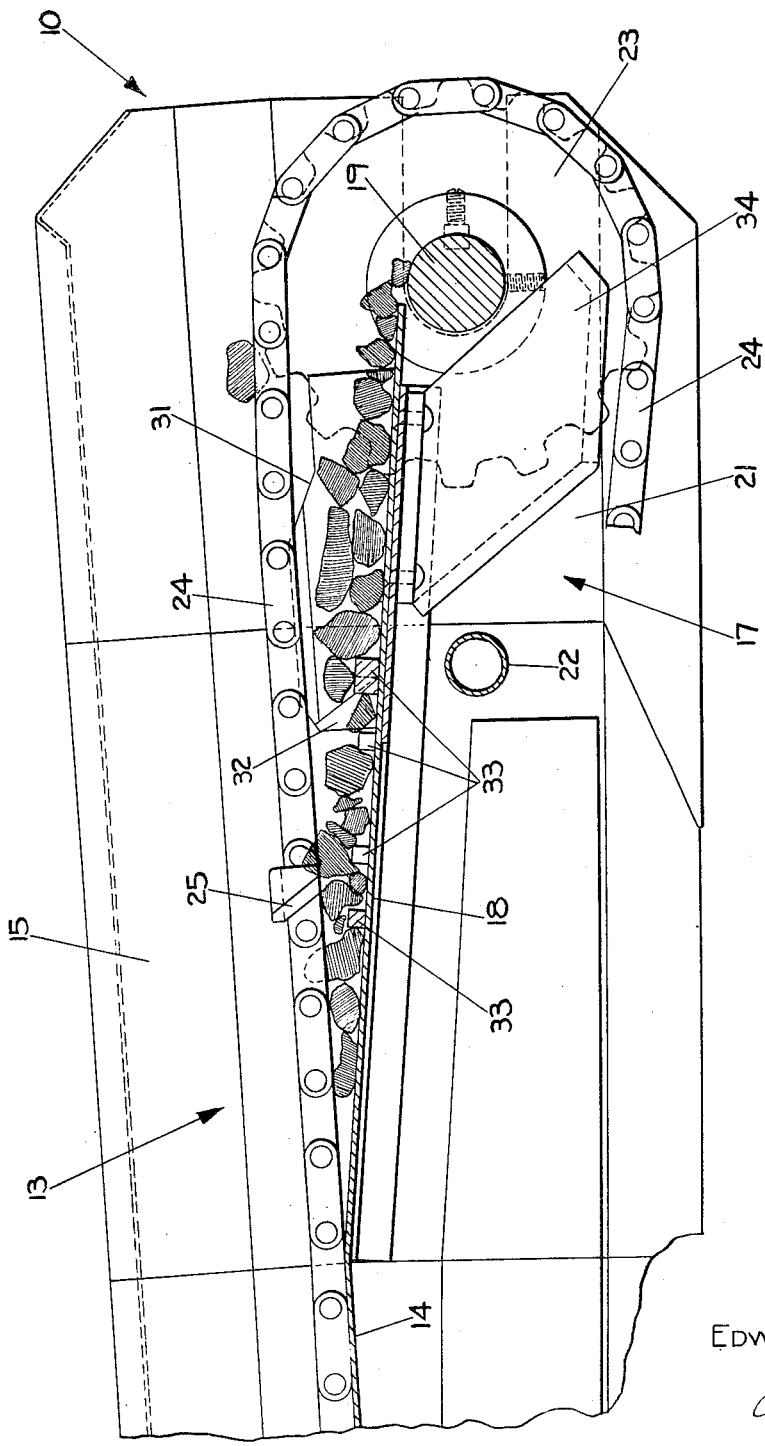
Fig. 4 is an enlarged sectional elevational view of the head end taken on the line 4—4 of Fig. 1 looking in the direction of the arrows.

By placing Figs. 1 and 5 of the drawings end to end there is illustrated in plan a conveyer comprising my invention, it being understood, of course, that the length thereof is greatly reduced over that of the actual conveyer since conveyers of this type are constructed with a length as great as seven hundred and fifty feet. Said conveyer comprises a head section 10, a tail section 11 and a plurality of removable intermediate sections one of which is seen at 12 in Figs. 5 and 6 of the drawings. The head, tail and intermediate sections are removably attached together by means hereinafter described in full detail, to form a continuous trough 13 having a material supporting bottom 14 and upwardly extending outwardly sloping sides 15 which trough is adapted to receive and support material, such as coal, to be conveyed from the tail section and discharged over the head section of said conveyer.

The head section comprises a supporting frame 16 adapted to rest upon the mine floor and upon which is supported the trough 13 of said head section 10. The forward portion 17 of said head section 10 comprises a bottom plate 18 which is an extension of the bottom plate 14 thereof but which slopes downwardly from the plane of said bottom plate 14 and terminates adjacent and above a head drive shaft 19 which is journaled in journal bearings 20, 20 on opposite sides of said forward portion 17. Said forward portion 17 also includes a pair of upright side plates 21, 21 between which a supporting or bracing pipe 22 extends to impart rigidity thereto. The lateral side edges of the bottom plate 18 are rigidly attached to said side plates 21 to provide a rigid structure.

By reference to Figs. 1 and 3 of the drawings, it is to be noted that the side plates 21, 21 diverge outwardly in the direction of material movement along the forward portion 17 of the head section 10. This lateral diverging as well as the diverging provided by the aforementioned sloping of the bottom plate 18 makes for a spreading out or distribution of the material adjacent said forward portion 17 which prevents material being caught between the conveyer chains and head sprockets, as hereinafter described in more complete detail.

Mounted upon the drive shaft 19 is a pair of drive sprockets 23, 23 which mesh with a pair of independent, separate conveyer chains 24, 24 adapted to slide along the bottom 14 of the trough 13 and provided with conveyer flights 25, 25 which conveyer flights 25, 25 of the independent chains are preferably off-set or staggered, as clearly illustrated in Fig. 1 of the drawings.

The head shaft 19 is driven from an electric motor 26 through a speed reduction mechanism 27, both of which are preferably mounted upon a skid frame 28, and through chain and sprocket drive mechanism 29. The skid frame 28 is adjustably attached to the head section 10 by a chain tensioning rod 30. As clearly seen by reference to Figs. 1 and 3 of the drawings, the skid frame 28 may be placed on either side of the head section 10 and by making appropriate reversal in the connections of the chain and sprocket drive mechanism 29 it is possible to locate the drive from the motor 26 to the head shaft 19 on either side of said head section 10.

To effect this reversible and adjustable connection, frame 28 carries pairs of side angles 130 and 131, one pair on each side, having holes through which rod 30 freely slides. The supporting frame 16 is provided with pairs of brackets 132 and 133, one pair on each side, the former of which have holes through which rod 30 freely slides, the latter of which have threaded holes into which rod 30 selectively threads. Rod 30 has a double head, the lower of which bears against a bracket 131 thereby maintaining the chain of drive mechanism 29 in proper tension.

As the material, such as coal, is conveyed forwardly along the trough 14 by the scraper conveyer chains 24 and flights 25 it is to be noted that the paths of the conveyer chains 24 diverge vertically from the bottom plate 18 at the forward portion 17 of said head section. This structure tends to prevent coal being caught between chain 24 and the teeth of a sprocket 23 resulting in throwing said chain 24 off of said sprocket 23. Furthermore, the widening of the forward portion 17 further reduces this tendency so that in practice it is practically eliminated, particularly in combination with the other elements associated with said forward portion 17 now to be described.

Directly behind each of the drive sprockets 23 is a deflector 31 which has at its rear end a wedge-shaped nose 32 comprising a vertical sharp edge at the intersection of intersecting vertical flat faces forwardly diverging and rising upwardly from the forward portion of the bottom plate 18 to a position adjacent a conveyer chain 24, as clearly illustrated in Fig. 4 of the drawings. The deflector extends forwardly from the wedge-shaped nose 32 and is provided at its sides with flat faces which converge from the plate 18 upwardly to an elongated guide along which the chain 24 may ride. Forwardly of such guide the deflector 31 is bifurcated so as to extend the lateral inclined faces to positions at opposite sides of the sprocket 23, as shown in Fig. 1. Any material moving under either chain is diverted from such positions to opposite sides of the sprockets 23, 23.

Furthermore, the bottom plate 18 is provided with a plurality of upstanding lugs 33 spaced as illustrated best in Fig. 1 of the drawings, which are adapted to be struck by any lump of coal which comes in contact with them and to turn it over, thereby loosening up semi-compact masses of coal for freedom of deflection and expansion laterally. These lugs are very effective in giving the conveyed masses of coal a churning action so that the coal can more easily be acted on by the deflectors and so that the coal will become sufficiently loosened for free lateral movement away from the sides of the sprockets. In other words, the downward sloping of the bottom plate 18 with respect to the line of travel of a chain 24, the lateral diverging of the forward portion 17, the provision of the deflectors 31, and the lugs 33 all cooperate to prevent the conveyer chains 24 from being thrown off of their drive sprockets 23. This is particularly important where the conveyers are of unusual length, in which case there is inherently an appreciable amount of slack in the chains 24. It may also be mentioned that on each side of each of the drive sprockets 23 is a chain stripper 34 (see Fig. 4), comprising a vertical plate and a wearing shoe which strippers contact and strip the chains 24 from said sprockets 23.

The tail section 11 of the conveyer comprises a bed pan 35 adapted to rest upon the mine floor upon which is mounted for longitudinal sliding movement an axle box 36 provided with a rear attaching plate 37 adapted to receive a chain to be attached to a mine jack to adjust said axle box 36 to maintain the chains 24, 24 in proper tension. Said axle box 36 is provided with a pair of journal bearings 38, 38 which receive the tail shaft 39 upon which is mounted a pair of idler sprockets 40, 40 which receive the conveyer chains 24, 24. Said axle box 36 also preferably carries a pair of hold-down sprockets one of which is seen at 41 in Fig. 6 of the drawings, there being one associated with each of the chains 24, 24. Lifting handles 42, 42 are also provided for the bed pan 35 and axle box 36 and similar lifting handles 43, 43 are provided for a forward extension 44 of said tail section 11.

To provide for the ready removable attachment of the head, tail and intermediate sections 10, 11 and 12, I provide simple attaching means, best shown in Fig. 6 of the drawings. Said attaching means comprises a pair of horizontally aligned loops 45, 45 carried by the tail section 10 between which extends an aligned loop 46 carried by intermediate section 12. Said loops 45 and said loop 46 are aligned and receive a tapered wedge or pin 47 which, when driven in place, ruggedly but flexibly attaches said sections together. Similar attaching means is seen at 48 in Fig. 2 of the drawings for attaching head section 10 and intermediate section 12. It will be understood that the attaching means is duplicated on each side and that each intermediate section is attached by a similar structure. In this connection it is to be noted that the intermediate sections are self-supporting and consequently they are made of relatively heavy gauge material, the side flange being sufficiently strong to prevent undue sagging thereof.

In the operation of the device comprising my invention, conveyer chains 24, 24 drag along the bottom 14 of the trough 13 moving toward the head drive shaft 19, the material being fed to said trough 14 at any place along the length thereof back to the tail section 11. As the material is scraped along under the influence of the chains 24, 24 and the flights 25, 25 said material will ultimately reach the forward portion 17 of said head section 10 where it will pass along the downwardly diverging bottom plate 18 and strike the upstanding lugs 33 thereon. This will turn the material, such as coal, over and free it from any chain 24 or flight 25 if it happens to be caught thereunder. Furthermore, the diverging of the side plates 21, 21 of said forward portion 17 tends to spread out the material as it progressively moves away from the chains 24, 24 in traveling over said bottom plate 18. Still further, the deflectors 31, 31 will divert any material away from the position directly under a chain 24.

As a consequence of all these precautions no lump or mass of material will become lodged under a chain 24 so as to be caught between it and a sprocket 23 which would cause the chain to be thrown off said sprocket 23.

Furthermore, the above-described elements cooperate to prevent bending of the flights 25 by virtue of the fact that as said flights approach the shaft 19 they are spaced from the bottom plate 18 an appreciable amount as shown in Fig. 4, thus protecting said flights 25.

It is thus manifest that I have produced a conveyer which may be of variable and rather great length which will handle large tonnages of material and which will prevent damage to the conveyer chains and flights while at the same time protecting the drive sprockets thereof by preventing the conveyer chains being thrown off of the drive sprockets. Furthermore, I have provided a relatively simple means for removably connecting the various sections of a sectional extensible conveyer.

The flexible connections between sections not only permits adjustments as to the length of the conveyer but also provides a relatively flexible frame to allow it to follow the contour of an irregular floor.

The loader can be loaded with material at any number of positions, and at a plurality of positions at the same time, due to the sloping side plates 15, 15, the material being received directly in the path of the conveyer flights by which it is conveyed to and discharged over the head end of the conveyer, which, as best seen in Fig. 2, may overhang another conveyer, or other receptacle to receive the coal.

The strippers 34 operate to prevent any sticking of the chains 24 and head sprockets 23 after material is discharged.

The mounting of the motor 26 and speed reducer 27 on a separate skid frame, as best seen in Figs. 1 and 3, permits handling of the unit separately from the head section 10 of the conveyer, thus reducing bulk and making the moving of the conveyer from one position to another easier. As above noted, the power unit is also easily changed from one side to the other to meet varying conditions.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a conveyer, the combination with a material supporting trough, of conveyer means for moving material along said trough including endless chain means and a head sprocket mounted on a head shaft at the forward discharge end of said trough, said trough widening as it approaches said head sprocket, said head shaft being positioned below said discharge end of said trough.

2. In a conveyer, the combination with a trough, of a head shaft carrying a sprocket at the forward discharge end thereof, endless conveyer means adapted to extend through said trough and over said sprocket, the bottom of said trough at said forward end diverging downwardly from the path of said endless conveyer means, said sprocket extending through the plane of said bottom and upwardly extending projections carried on said diverging bottom portion.

3. In a conveyer, the combination with a trough, of a head shaft carrying a sprocket at the forward discharge end thereof, endless conveyer means adapted to extend through said trough and over said sprocket, the bottom of said trough at said forward end diverging downwardly from the path of said endless conveyer means while extending in a plane above said head shaft, the trough also widening at said forward end.

4. In a conveyer, the combination with a trough adapted to receive and support material, of endless draft means for scraping material along said trough, a head shaft having a sprocket extending into the trough for receiving said draft means and positioned at the head end of said trough, said head end having a downwardly diverging bottom and outwardly diverging sides, said bottom extending above said head shaft and upwardly extending projections carried by the head bottom.

5. Conveyer apparatus comprising the combination with an elongated trough having parallel spaced-apart side walls with a flat bed between the same, of a discharge extension of said trough having diverging spaced-apart walls in continuation of said side walls and having between such diverging walls a downwardly diverging bed in continuation of the flat bed between said parallel walls, conveying means movable along said flat bed between said parallel walls and through said discharge extension to move the material directly under the influence thereof until it is discharged over the edge of said discharge extension, and conveyer driving mechanism at the discharge end of said discharge extension for directing the conveying means along a path extending in the plane of said flat bed and spaced above said diverging bed to prevent material being conveyed from entering between the conveying means and the said driving mechanism, the downwardly diverging bed being laterally expanded to said diverging spaced-apart walls to give such material freedom from being overcrowded.

6. Conveyer apparatus comprising the combination with a conveyer trough having spaced side walls diverging laterally at its discharge end portion and having a conveyer bed diverging downwardly along such discharge end portion, of conveyer mechanism extending along said trough, a drive shaft below the discharge end of said bed, and connecting mechanism between said shaft and said conveyer mechanism for driving the latter while holding the same spaced above the downwardly diverging portion of said bed to permit conveyed material to have freedom of lateral expansion between the aforesaid spaced laterally diverging side walls.

7. Conveyer apparatus comprising the combination with a trough having spaced-apart side walls diverging laterally at its discharge end portion and having a conveyer bed diverging downwardly along such discharge end portion, a drive shaft below the discharge end of said bed, spaced-apart sprockets on said shaft to be driven thereby and extending upwardly above the plane of said downwardly diverging bed, and conveyer mechanism driven by said sprockets while being held by the latter above said downwardly diverging bed to permit conveyed material to expand laterally toward said spaced laterally diverging side walls to prevent material from being caught between the conveyer mechanism and said sprockets and permit such material to move freely from the discharge end of said bed over the top of said shaft.

8. Conveyer apparatus comprising the combination with a trough having a flat bed between parallel side walls merging into a relatively sloping bed expanded laterally between diverging side walls at the discharge end portion of the trough, of a plurality of chain flight conveyers movable along said trough, a drive shaft at the discharge end of said sloping bed and below the plane thereof, spaced sprockets on said shaft connected to said chain flight conveyers to drive the same, and spaced deflectors between the chains and the sloping bed in position to laterally deflect material being conveyed away from where the chains mesh with the sprockets.

9. Conveyer apparatus comprising the combination with a trough having a flat bed between parallel side walls merging into a relatively sloping bed expanded laterally between diverging side walls at the discharge end portion of the trough, of a plurality of chain flight conveyers slidable along said flat bed but spaced from said sloping bed, a transverse driving shaft, spaced sprockets on said shaft and meshing with the conveyer chains in the plane of said flat bottom, a plurality of sharp-nosed deflectors one for each of said chains to ride upon, and means for rotating said shaft to slide the material along said trough to said sloping bed where the diverging side walls co-operate with said deflectors to divert material from where the chains mesh with the sprockets.

10. Conveyer apparatus comprising a conveyer chain spaced above a conveyer bed, and a deflector between the chain and the bed and comprising a cutting edge between laterally and forwardly extending flat surfaces at right angles to the bed, said deflector also comprising means forming side surfaces branching downwardly and laterally from an elongated guide adapted to be engaged by the chain, and means comprising a sprocket for driving said chain by meshing with said chain and rotating through a slot in said deflector spaced from said guide.

11. In conveyer apparatus, the combination with a chain flight conveyer, of mechanism affording a bed along which said conveyer is adapted to slide the material, means comprising a sprocket for driving said chain flight conveyer, a deflector having a cutting edge in the plane of the sprocket but spaced from the sprocket, a plurality of upward projections on the discharge end portion of the bed near said cutting edge in position to engage the bottom of a lump of material to effect rolling thereof while engaging said cutting edge and thereby effect the splitting of said lump in two, and mechanism mounting said sprocket in position to hold the chain flight conveyer spaced above the discharge end portion of the bed to ride along the top of said deflector.

12. Conveyer apparatus comprising the combination with a trough having spaced-apart side walls diverging laterally at its discharge end portion and having a conveyer bottom, a drive shaft below the discharge end of said bottom, a sprocket on said shaft to be driven thereby and extending upwardly above the plane of said bottom, and conveyer mechanism driven by said sprocket while moving over said bottom, said diverging side walls providing for lateral expansion of material flowing through said trough adjacent said sprocket.

EDWIN B. GELLATLY.